United States Patent [19]
Chow

[11] Patent Number: 5,631,826
[45] Date of Patent: May 20, 1997

[54] ROUND BALER END WRAP CONTROL

[75] Inventor: Mark K. Chow, Paoli, Pa.

[73] Assignee: New Holland North America, Inc., New Holland, Pa.

[21] Appl. No.: 821,579

[22] Filed: Jan. 16, 1992

[51] Int. Cl.$^6$ .................................................. G05B 11/01
[52] U.S. Cl. .............. 364/189; 364/146; 100/4; 100/99
[58] Field of Search ...................... 100/4, 48, 88, 100/99; 364/146, 400, 468, 186, 188, 131, 136, 138, 140

[56] References Cited

U.S. PATENT DOCUMENTS

| | | | |
|---|---|---|---|
| 3,962,846 | 6/1976 | Neitzel et al. | 100/4 X |
| 4,603,379 | 7/1986 | Strosser et al. | 364/130 |
| 4,609,984 | 9/1986 | Strosser et al. | 364/130 |
| 4,624,179 | 11/1986 | Yves et al. | 100/4 |
| 4,630,191 | 12/1986 | Strosser | 364/186 |
| 4,656,931 | 4/1987 | Van Der Bossche et al. | 100/4 |
| 4,674,403 | 6/1987 | Bryant et al. | 100/4 |
| 4,855,924 | 8/1989 | Strosser et al. | 364/468 |
| 4,924,405 | 5/1990 | Strosser et al. | 364/146 X |
| 4,998,961 | 3/1991 | Anderson et al. | 100/4 |

*Primary Examiner*—Paul P. Gordon
*Assistant Examiner*—Brian C. Oakes
*Attorney, Agent, or Firm*—Griffin, Butler, Whisenhunt & Kurtossy

[57] ABSTRACT

In a round baler having a microprocessor based controller for controlling the pattern in which twine is wrapped around a bale, factory installed programs, selectable by an operator through actuation of control keys, provide a plurality of twine wrap patterns each of which includes two wraps at each end of the bale. An operator's panel is provided with keys which, when actuated, modify the number of end wraps. The factory installed programs are not otherwise modified. When a factory installed program is selected, the number of end wraps placed on each end of the bale is determined by the modified number of end wraps.

14 Claims, 8 Drawing Sheets

ROUND BALER END WRAP CONTROL

FIELD OF THE INVENTION

This invention relates to improvements in automatic bale wrapping systems of the type described in Strosser et al. U.S. Pat. No. 4,603,379, the disclosure of which is incorporated herein by reference. More particularly, the present invention provides a method and apparatus which permits an operator to easily select the number of end wraps of a binding filament to be wrapped around the ends of a round bale of crop material.

BACKGROUND OF THE INVENTION

A typical bale wrapping mechanism of the prior art includes a filament dispensing apparatus having a pair of dispensing tubes that are movable in an arcuate path downwardly toward and lengthwise of a bale. After a bale has been formed in a bale forming chamber, the dispensing tubes are extended so that the filament is caught up by, and wrapped around the rotating bale in a circular pattern of starting wraps. The dispensing tubes then move lengthwise of the bale toward its ends so that the filament is helically wrapped around the bale. Periodically, the dispensing arms stop or dwell so that circular wraps are made around the bale. Typically, circular wraps are made near each end of the bale and at one or more locations intermediate the end wraps and the starting wraps. After a wrapping operation is completed, the dispensing arms are retracted to a home or cut position where the filament is cut, thus separating the twine supply from the portions which have been wrapped around the bale.

The aforementioned patent to Strosser et al. discloses a microprocessor based control system for automatically controlling the wrapping of round bales with a filament. The system is operable in a learning mode wherein the operator manually controls the filament dispensing mechanism by selective actuation of "extend" and "retract" buttons or switches on an operator's control panel. The microprocessor stores commands representing the switch actuations and the intervals they are actuated. Subsequently, when an operator desires to wrap another bale, he merely actuates a "tie" or "wrap" switch on the control panel. The microprocessor then automatically controls wrapping of the bale in accordance with the signals stored during the learning mode.

Commercially available models of balers employing the Strosser et al. control system are also provided with three factory installed filament wrapping programs. These programs typically provide for 14 to 24 total wraps of a bale, including two starting wraps and two wraps at each end of the bale.

Yves et al. U.S. Pat. No. 4,624,179 discloses two embodiments of a bale wrapping control system, one embodiment being quite similar to the Strosser et al. device described above. In a another embodiment, two thumbwheel switches are provided: one for setting the limit of bale diameter and one for selecting the total number of wraps to be placed on each bale. From this information, a microprocessor computes the required number of dwells and the required period of each dwell in order for the bale to be wrapped by the total number of wraps set on one of the thumbwheels.

It is desirable that the number of wraps made around a bale be kept to a minimum to conserve filament and to reduce the wrapping time. For most bale wrapping operations, two wraps at each end (with intermediate wraps as described above) are sufficient to maintain the integrity of the bale during handling and storage. However, it has been found that the integrity of bales of spongy or stalky crop material with high expansion characteristics cannot be reliably maintained with just two end wraps. The end wraps do not always keep the ends of the bale tight and the filament eventually slips off the end of the bale. Such end wrap failures cause bale handling difficulties or loss of the bale during transport.

Obviously, it is desirable that the operator be able to quickly and easily change the number of end wraps placed on bales. However, this is not possible in the prior art systems described above. In the Strosser et al. system, and one embodiment of the Yves et al. system, the operator must place the system in the learning mode and then selectively and repeatedly actuate the extend and retract switches to cycle the wrapping mechanism through a complete bale wrapping operation. The process must be repeated when the operator desires to change back from a pattern of more than two end wraps to a pattern of just two end wraps. In the alternate embodiment described in the Yves et al. patent, the number of wraps is changed by adjusting a thumbwheel. However, this adjustment changes the total number of wraps, not just the number of end wraps.

SUMMARY OF THE INVENTION

An object of the present invention is to provide a method and apparatus permitting an operator to quickly adjust the number of end wraps of a filament placed on a bale without otherwise changing the wrapping pattern.

Another object of the present invention is to provide a method and apparatus permitting an operator to incrementally change the number of end wraps placed on a bale.

Yet another object of the invention is to provide a method and apparatus for modifying the response of a bale wrap controller to a factory installed program so that the number of end wraps placed on a bale differs from the number of wraps specified by the program.

In accordance with the principles of the present invention, a microprocessor based controller controls a filament dispensing apparatus to wrap bales of crop material in a selectable pattern, the number of end wraps in the pattern being selectable by operation of switch keys provided on an operator's control panel. A factory installed program initializes an end wrap location to the value 2. The control panel has a first switch key which is actuated to select the end wrap change mode, and two further switch buttons for incrementing and decrementing the value in the end wrap location. The end wrap count is displayed on the control panel as it is modified. When a wrap sequence is initiated and the operator selects one of the factory installed programs to control the wrapping of the bale, the last value entered in the end wrap location is used to control the placing of end wraps on the bale.

Other objects of the invention and its mode of implementation will become obvious from the following description and the accompanying drawings.

DETAILED DESCRIPTION OF THE INVENTION

Figure 1:
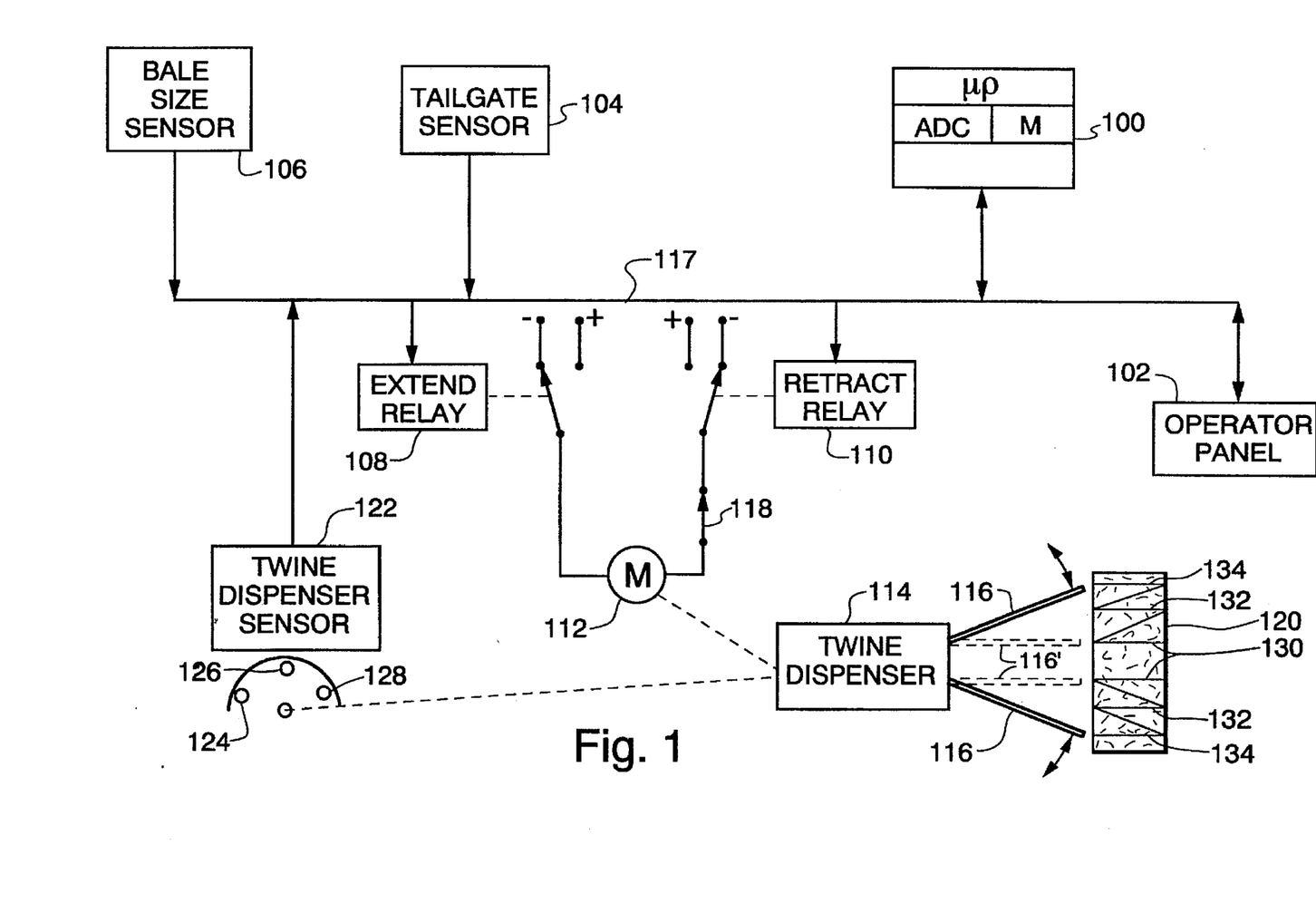
FIG. 1 is a schematic block diagram of a filament dispensing control system.

FIG. 1 schematically represents a round bale wrap control system of the type disclosed in Strosser et al. U.S. Pat. No. 4,603,379. The control system includes a microprocessor based controller 100, an operator's panel 102, a tailgate sensor 104, a bale size sensor 106, an extend relay 108, a retract relay 110, a filament (twine) dispenser drive motor 112, a twine dispenser mechanism 114 having two twine dispensing tubes 116, and a twine dispenser sensor 122, interconnected by a plurality of busses collectively illustrated as bus 117.

The controller 100 includes a microprocessor, storage, interface adapters and an analog-to-digital converter, all of which are of conventional design.

The tailgate sensor 104 is a magnetically actuated switch which produces an output signal when the tailgate of the baler is closed.

The bale size sensor 106 is a rotary potentiometer operated by the apron mechanism of the bale forming chamber so as to produce an analog output signal representing the diameter of a bale as it is being formed. The bale size sensor 106 may be of the type shown in Strosser et al. U.S. Pat. No. 4,855,924. The output signal from sensor 106 is applied over a bus 117 to the ADC within controller 100.

The extend relay 108 and retract relay 110 selectively control the twine dispenser drive motor 112 which drives the twine dispenser mechanism 114. When the extend relay 108 is energized, motor 112 is driven in one direction to extend two twine dispensing tubes 116 downwardly and outwardly toward a bale 120 in the bale forming chamber. The fully extended positions of the tubes are illustrated in broken lines at 116'. When the retract relay is energized, the drive motor 112 is driven in the opposite direction to raise and retract the dispensing tubes. A switch 118 controls selection of net or twine as the wrapping material and insofar as the present invention is concerned the switch is always closed to select twine.

The twine dispenser sensor 122 comprises an electromagnetic switch mounted in a fixed position and operated by three magnets 124, 126 and 128 located on the twine dispenser mechanism 114 so as to produce an output signal as the twine dispenser mechanism reaches each of three positions. The three positions are defined as the "insert" position, where the twine tubes are fully extended as illustrated at 116', the "pre-cut" position corresponding to the twine tube position during end wrapping and illustrated at 116, and a "cut" position where the twine tubes are fully retracted.

Figure 2:
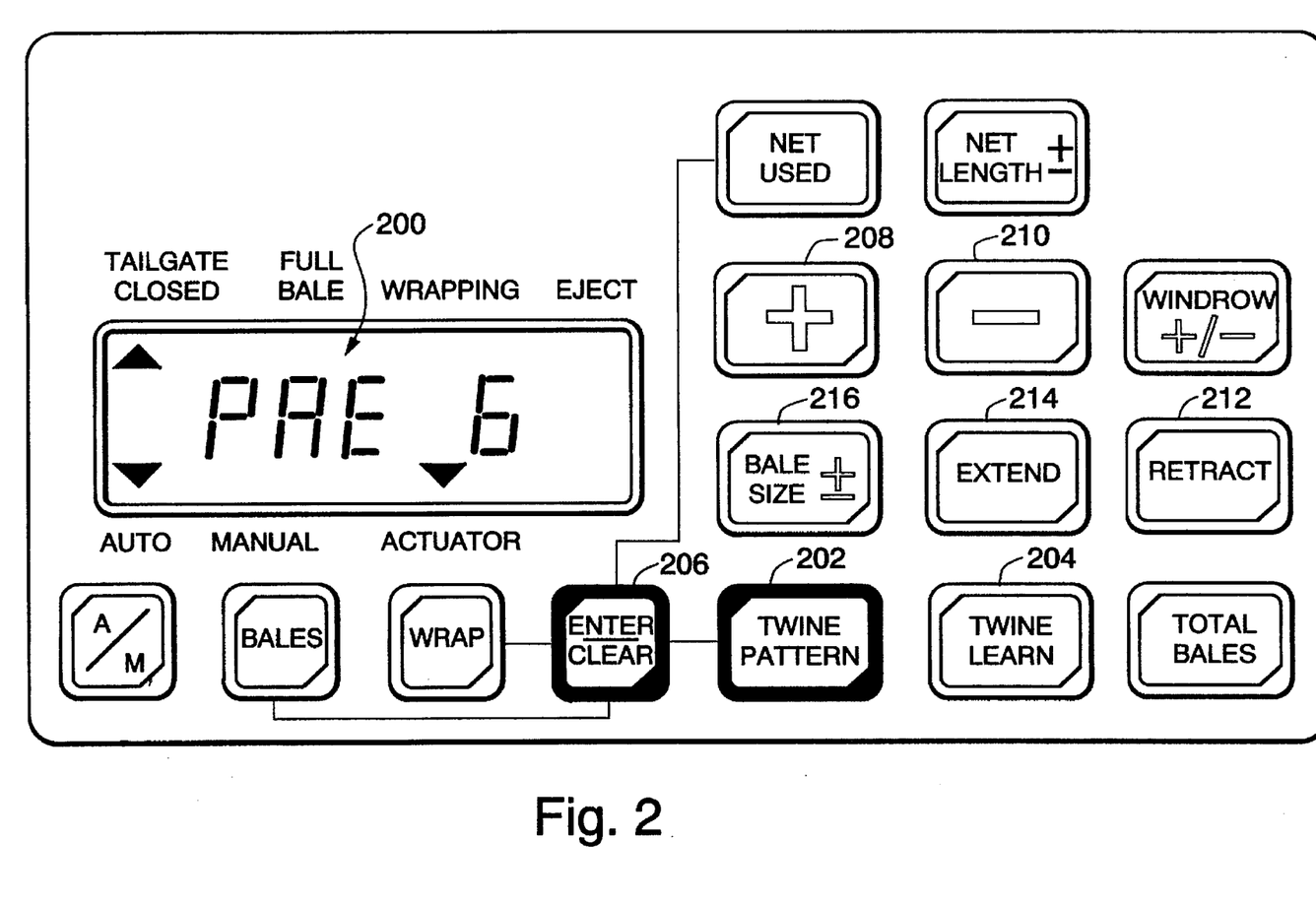
FIG. 2 shows an operator's panel for inputting control signals to the system and visually displaying information regarding the status of the system; and, FIGS. 3A, 3B, 3C, 3D, 3E, 3F and 3G comprise a flow diagram illustrating a routine for manually selecting the number of end wraps to be placed on a bale and controlling a dispensing mechanism to wrap a bale with the selected number of end wraps.

FIG. 2 shows the layout of the operator's control panel 102. The control panel has an LCD or similar display area 200 for selectively visually displaying various information, and a plurality of buttons or keys each of which operates a set of switch contacts (not shown) when the button is depressed. FIG. 2 shows a full complement of keys, many of which are not necessary in obtaining the objectives of the present invention.

As described in Strosser et al. U.S. Pat. No. 4,603,379, the controller executes a MAIN program which is interrupted every 10ms to execute a Non-Maskable Interrupt (NMI) routine. During execution of the NMI routine the controller samples output signals from the switches in the control panel 102 as well as the output signals from the various sensors 104, 106 and 122, stores their status and changes the information displayed in display area 200. Except for the bale size sensor 106, the sensed signals are "debounced" by a routine which requires five executions of the NMI routine before a signal is recognized. If a status signal maintains a given state over five samplings, the controller 100 stores in its memory (M) a flag indicating the status of the key switch or sensor.

Insofar as the present invention is concerned, the control panel is provided with a twine pattern key 202, a twine learn key 204, an enter/clear key 206, an increment key 208 and a decrement key 210.

The twine pattern key 202 is used to select one of six wrap pattern programs designated PAt1–PAt6. PAt1–PAt3 are factory installed programs stored in non-volatile memory in the controller 100. Typically, these patterns provide 14, 18 or 22 wraps including two starting wraps and two end wraps. PAt4–PAt6 are custom twine pattern programs generated by operator actuation of a retract key 212 and an extend key 214 while the system is in the learning mode as explained in Strosser et al. U.S. Pat. No. 4,603,379.

When the twine pattern key 202 is depressed, the controller senses the switch actuation and in return sends data to the operator's panel to display in display area 200 the letters PAt and the number of the last selected pattern program.

A twine pattern program may be selected by depressing the enter/clear key 206 while the twine pattern key is depressed. The controller increments a counter each time the enter/clear key 206 is pressed while the twine pattern key 202 is depressed and the contents of the counter are sent to the operator's panel to update the pattern program number displayed in display area 200. The counter cycles from 1 to 6 and then repeats. The program pattern which is selected is the program pattern whose number is displayed at the time the keys are released. The selected program number is stored in the controller memory at location SEL_TW_PAT.

The twine learn key 204 has two functions. One function is to place the system in a learning mode so that an operator may program or reprogram a customized wrap procedure PAt4–PAt6 by selective actuation of the retract and extend keys 212 and 214 as explained in Strosser et al.U.S. Pat. No. 4,603,379. The second function is to select or modify the number of end wraps for the factory installed twine pattern programs PAt1–PAt3. To modify the number of end wraps for one of the programs PAt1–PAt3, the program is first selected by operation of the twine pattern and enter/clear keys 202 and 206 as described above. Next, the twine learn key 204 is depressed. The controller 100 senses the key actuation and sends data to the display area 200 to display the current number of end wraps for the selected pattern program. The number of end wraps is then increased or decreased by pressing the "+" or "−" keys 208 and 210. The number of end wraps may be from 2 to 5. If another twine pattern program is selected, the number of end wraps is automatically reset to 2 as subsequently explained.

FIGS. 3A–3G are flow diagrams illustrating a routine for selecting a wrap pattern and the number of end wraps to be applied to a bale, and controlling the twine dispensing mechanism in accordance with selections made. It should be remembered that the routine illustrated is periodically interrupted to execute an NMI routine and the status of the various sensors and keys on the operator's panel at the time the NMI routine was last executed is stored in the memory of the controller 100 as described above.

Selecting A Wrap Pattern and Number of End Wraps

Figure 3A:
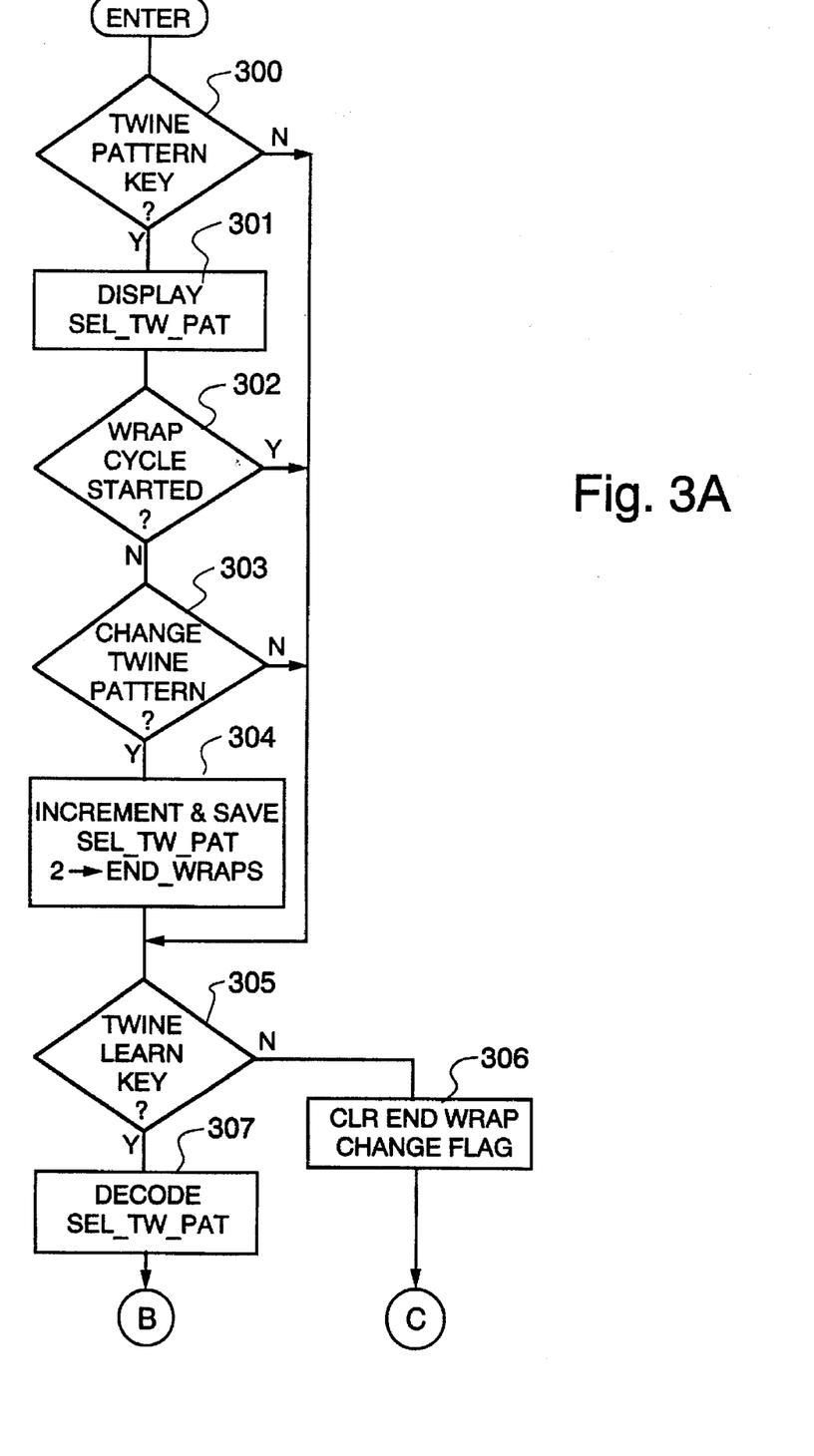

The program begins in FIG. 3A where the status of the twine pattern key 202 is tested at step 300 and if the key is depressed the controller 100 executes step 301 where it retrieves the value of the last selected twine wrap pattern from location SEL_TW_PAT and sends it to control panel 102 for display in display area 200. Since a wrap pattern should not be changed during a wrapping operation, a test is then made at step 302 to see if a wrap cycle is in progress. The test checks a Wrap Enable flag and an Extend flag to see if either flag is set.

If the test at step 302 proves false, a check is made at step 303 to see if there is to be a change in the twine pattern value. This may be accomplished by checking the status of the enter/clear key 206 to see if it has been pressed while the twine pattern key was pressed. If key 206 has been pressed, the twine pattern value retrieved at step 301 is incremented at step 304. The new twine pattern value is saved at location SEL_TW_PAT after which location END_WRAPS is reset to the value 2.

A twine pattern change is not permitted during a wrap cycle. Therefore, if the test at step 302 shows that a wrap cycle is in progress the routine branches to step 305. Finally, the twine pattern may be changed only by concurrent actuation of the twine pattern key 202 and the enter/clear key 206. Therefore if key 202 is not depressed the routine branches from step 300 to step 305 and if key 206 is not depressed the routine branches from step 303 to step 305.

Figure 3B:
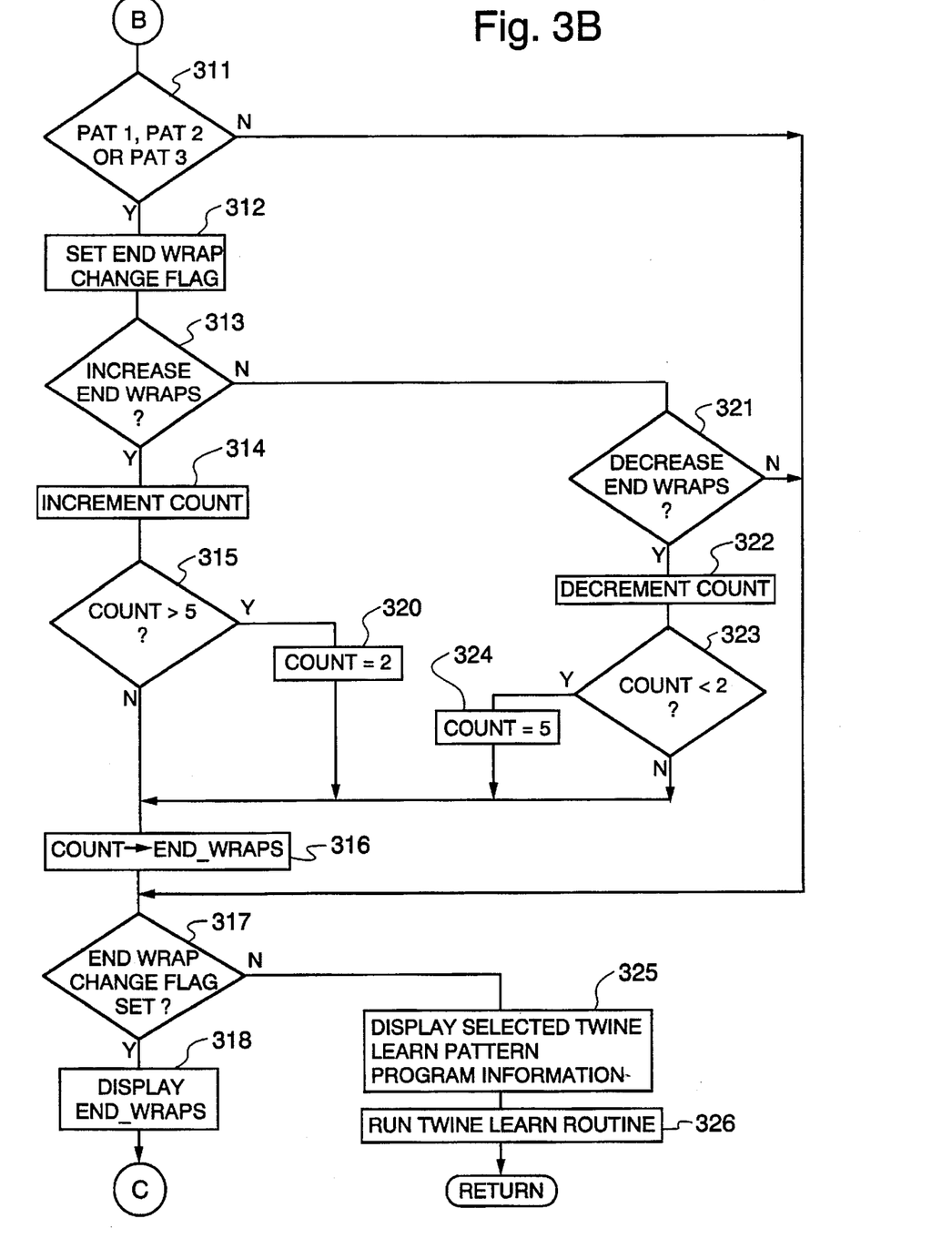
Figure 3C:
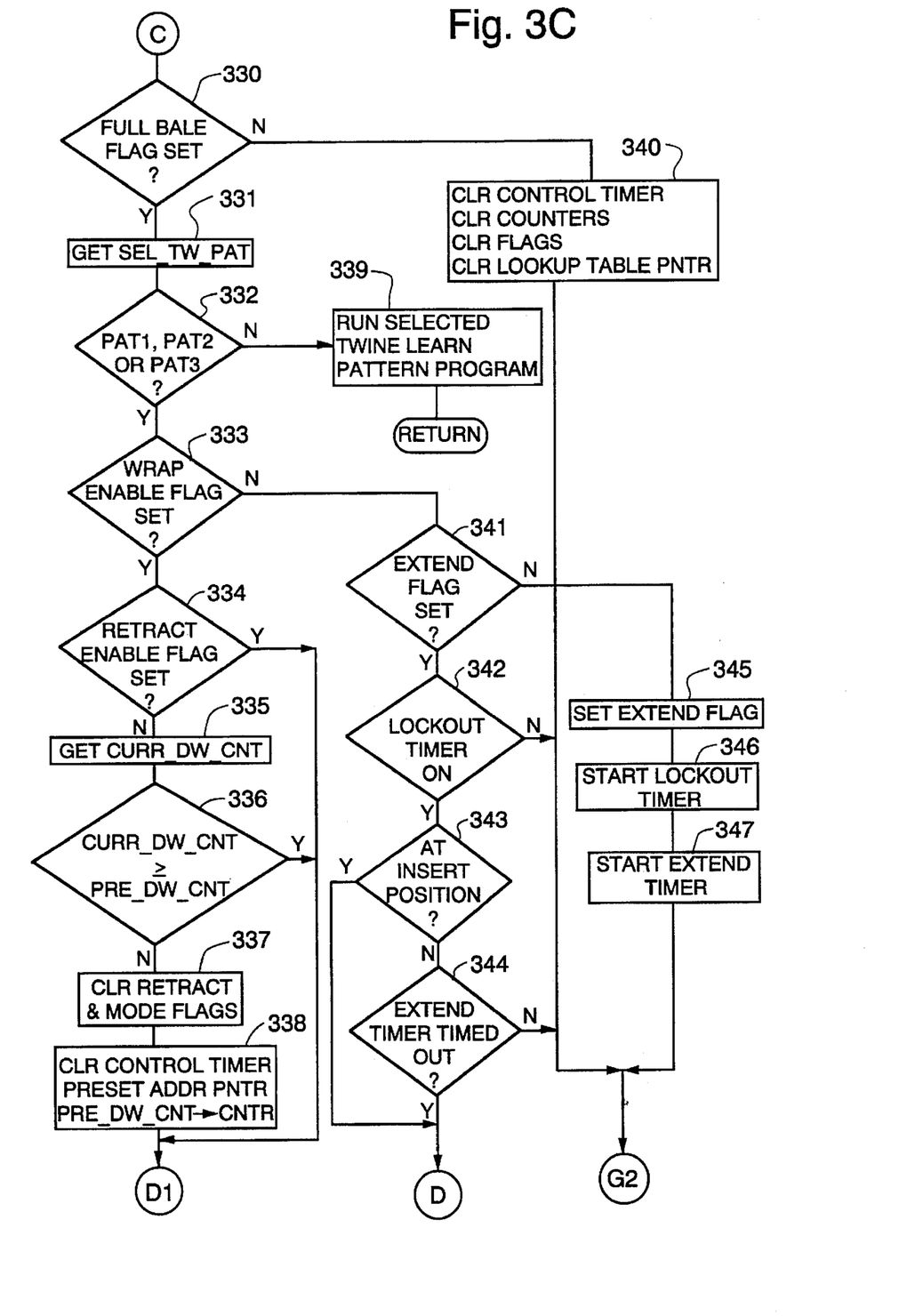

At step 305, the controller tests the status of the twine learn key 204. If the test shows that the twine learn key is not pressed then no adjustment of the number of end wraps is to be made. An End Wrap Change flag is cleared at step 306 and the program moves directly to step 330 (FIG. 3C). On the other hand, if the test at step 305 shows that the twine learn key 204 is depressed, then at step 307 the controller retrieves the last selected twine pattern number from memory location SEL_TW_PAT and decodes it. At step 311 (FIG. 3B) the decoded selected twine pattern is tested to see if it is any one of the factory installed pattern programs PAt1, PAt2 or PAt3. According to the embodiment of the invention described herein, the operator may change the number of end wraps only of factory installed pattern programs but may not change the number of end wraps of customized pattern programs without resequencing the entir pattern program using the retract and extend keys 212 and 214.

If the test at step 311 shows that one of the factory installed pattern programs is not presently selected, the routine branches to step 317 where an End Wrap Change flag is tested. Under the assumed conditions this flag is not set so the program moves to step 325 where signals are sent to the display 200 to display information regarding the presently selected twine learn pattern program. At step 326 the twine learn program is executed as described in Strosser et al. U.S. Pat. No. 4,603,379 after which the program returns to step 300.

On the other hand, if the test at step 311 shows that one of the factory installed pattern programs PAt1, PAt2 or PAt3 has been selected, the End Wrap Change flag is set at step 312. Since the twine learn key 204 has two functions it is necessary to prevent display of the twine learn pattern code and step count of a program when the twine learn key is actuated for the purpose of changing the number of end wraps.

The twine learn key and either the "+" or "−" key must be concurrently depressed in order to change the number of end wraps to be applied to a bale. The status of the twine learn key was tested at step 305 and the status of the "+" key 208 is tested at step 313 to see if the number of end wraps is to be incremented. All of the factory installed programs specify two end wraps and a memory location END_WRAPS is initialized to this value. If the test at step 313 proves true, END_WRAPS is incremented at step 314 and the incremented value tested at step 315 to see if it is greater than 5. If it is not, the incremented value is saved at END_WRAPS by executing step 316. The End Wrap Change flag was set at step 312 so the test at step 317 proves true. At step 318 the incremented end wrap value is sent from controller 100 to operator panel 102 so that the incremented end wrap value is displayed in the display area 200.

If the test at step 313 proves false, the status of the "−" key 210 is tested at step 321 to see if the number of end wraps is to be decremented. If the test at step 321 proves true, END_WRAPS is decremented at step 322 and at step 323 the decremented value is compared with the value 2. If the decremented value is not less than 2, the decremented value is saved by execution of step 316 and displayed on the display 200 when step 318 is executed.

Each time the routine of FIG. 3B is executed, the value END_WRAPS is incremented at step 315 if the "+" key 208 is actuated or decremented at step 322 if the "−" key 210 is actuated. If neither key 208 nor 210 is actuated, the test at step 321 proves false and the routine moves directly to step 317 to display the current value of END_WRAPS. When the twine learn key 204 is released, this is detected at step 305 so that the value END_WRAPS can no longer be changed.

If the twine learn key 204 is depressed and the "+" key 208 is repeatedly pressed, the value of END_WRAPS is incremented above 5, the maximum number of end wraps permitted. When the incremented value of END_WRAPS reaches 6, the test at step 315 proves true and at step 320 the incremented value is reset to 2. The value 2 is then saved at END_WRAPS by step 316 and displayed by step 318. If the twine learn key is still depressed and the "+" key continues to be repeatedly pressed, the end wrap count will again step from 2 toward 5.

If the twine learn key 204 is depressed and the "−" key 210 is repeatedly pressed, the value of END_WRAPS is decremented below 2, the minimum number of end wraps permitted. When the decremented value of END_WRAPS reaches 1, the test at step 323 proves true and at step 324 the decremented value is reset to 5. The value 5 is then saved at $END_{13}$ WRAPS by step 316 and displayed by step 318. If the twine learn key is still depressed and the "−" key continues to be repeatedly pressed the end wrap count again step from 5 to 2.

Assuming that the number of end wraps has been changed, then after sending the new end wrap count to the display at step 318, the controller advances to step 330. Step 330 tests the full bale flag. The output of the bale size sensor 106 is intermittently sampled by controller 100, digitized and saved. The digitized value is compared with a desired bale size value stored in memory after being selected by the operator by operation of a bale size key 216 on control panel 102. When the sampled bale size is equal to the desired bale size, the full bale flag is set by the controller.

Assume that the test at step 330 proves false. At step 340 a Retract counter, a Dwell counter and a control timer are cleared as is a lookup table pointer. In addition, step 340 clears various flags designated the Wrap Enable, Retract Enable, Precut Enable, Extend, Retract, Mode and Retract To Cut flags. The program then advances to step 390 (FIG.

Figure 3D:
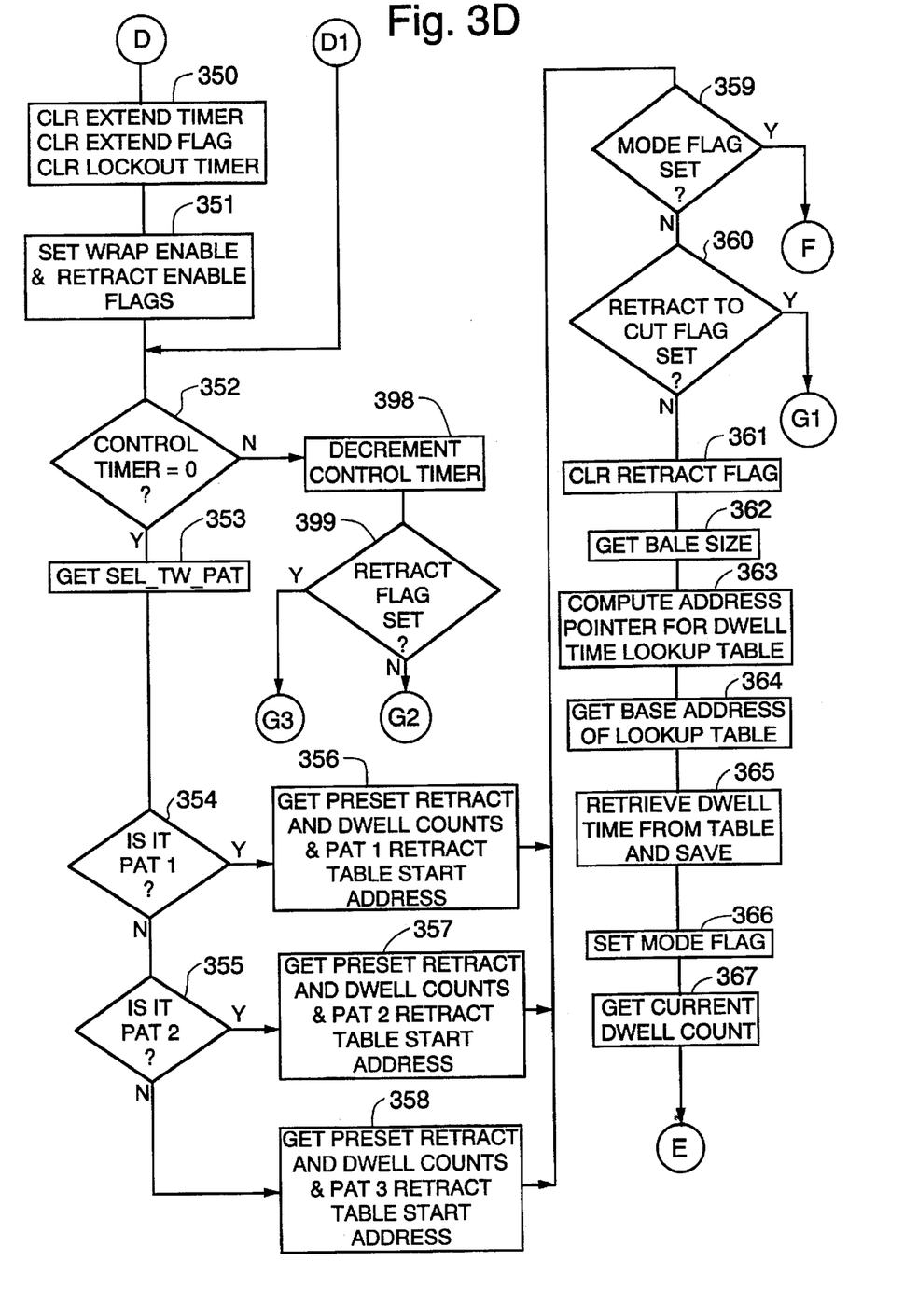
Figures 3E, 3F:
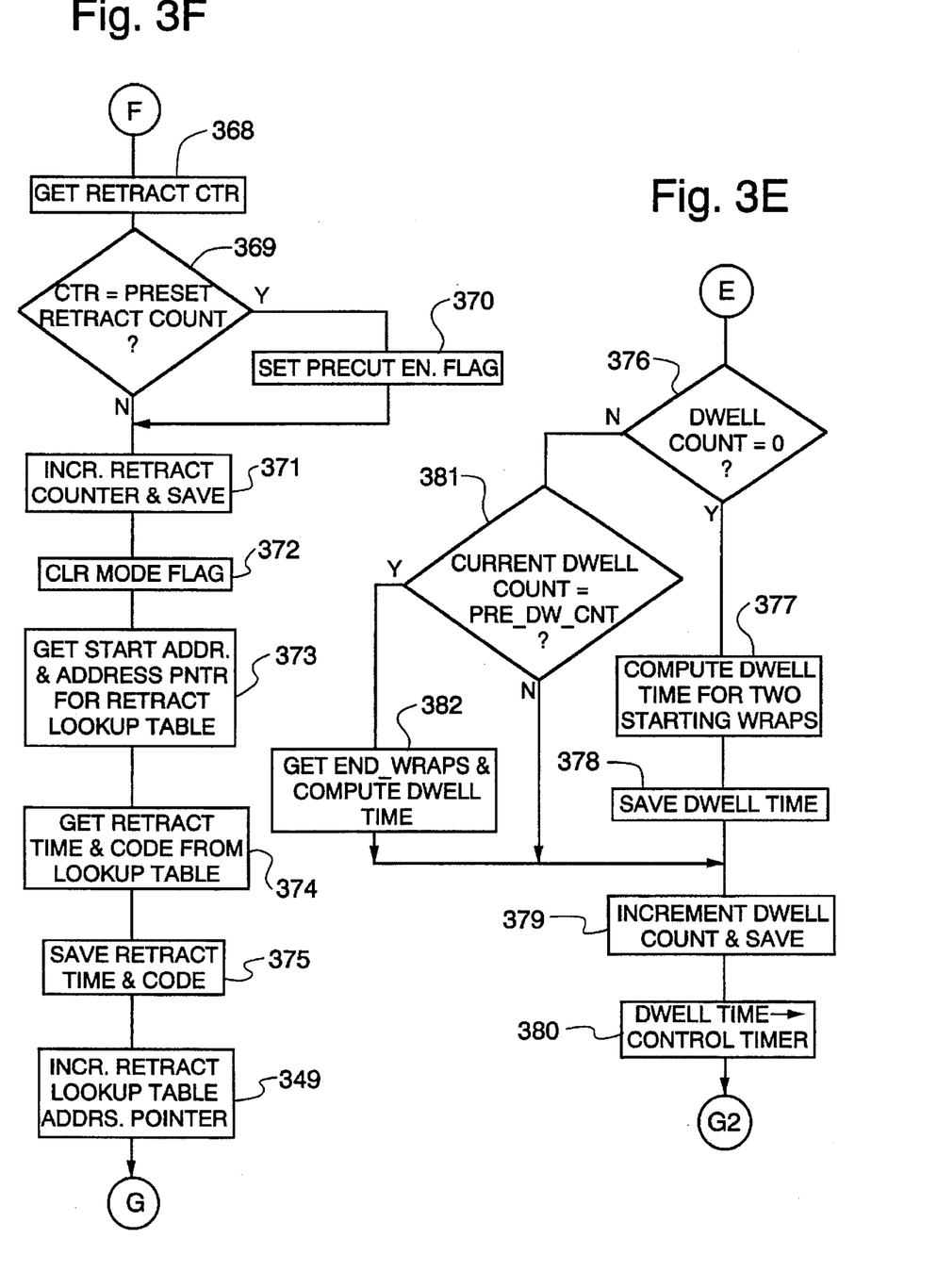
Figure 3G:
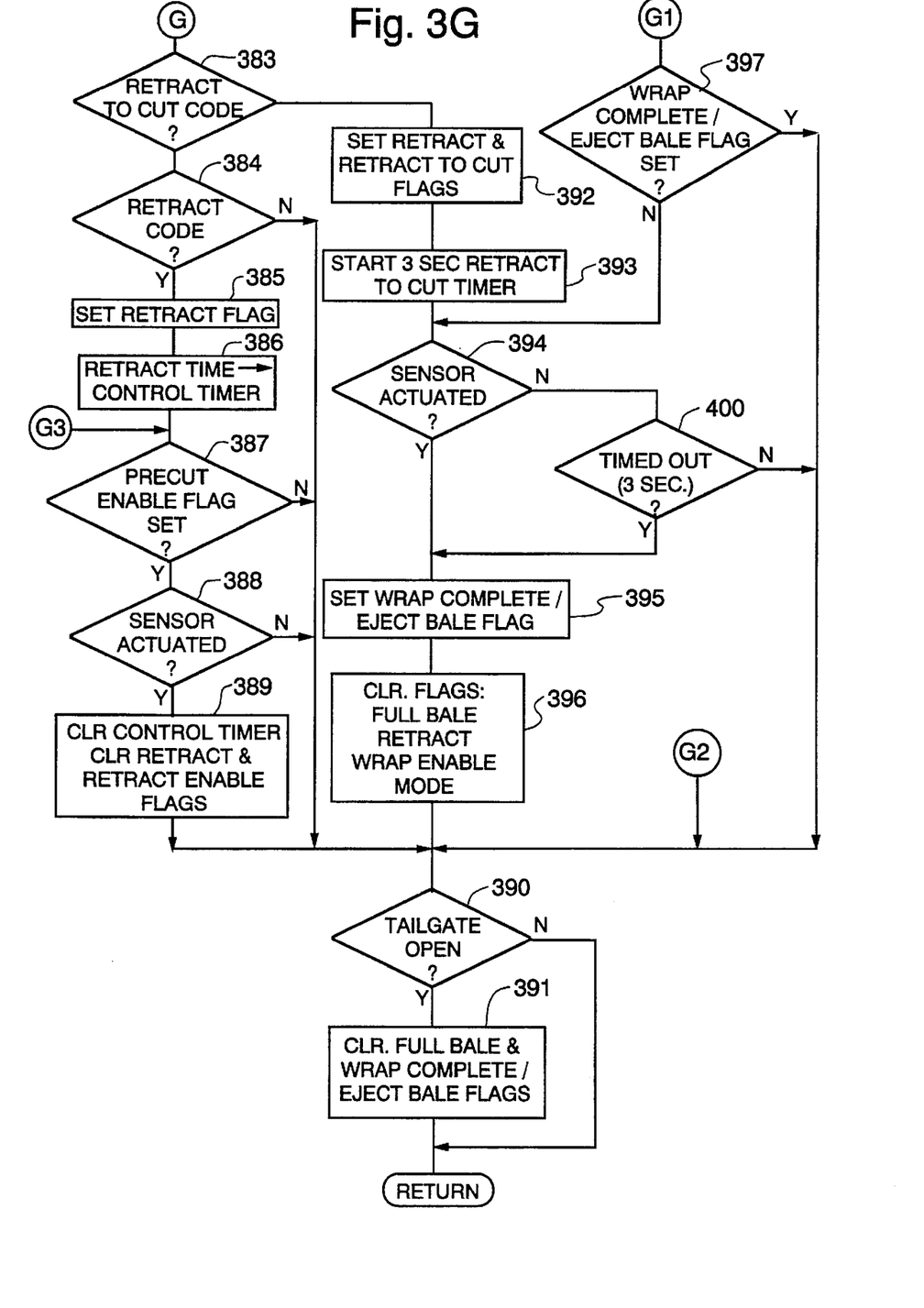

3G) where the status of the tailgate sensor 104 is tested. If the tailgate is open, the Full Bale and Wrap Complete/Eject flags are cleared and the program returns to step 300 (FIG. 3A) to begin a new cycle. If the tailgate is not open, the program returns to step 300 from step 390.

From the foregoing description it is seen that the number representing the selected twine pattern is incremented by one during a single pass through the program if the twine pattern key 202 and enter/clear key 206 are depressed. If the twine learn key 204 and either the "+" key 208 or the "−" key 210 are depressed then the number of end wraps is incremented or decremented by one during each pass through the program. The incrementing or decrementing continues as long as the respective keys are repeatedly pressed except that the incrementing of the number representing the selected twine pattern is inhibited once a wrap cycle has started.

Wrap Sequence

Starting A Wrap Sequence.

The wrap sequence for wrapping a bale in accordance with a selected twine wrap pattern is initiated automatically when the size of the bale being formed in the bale forming chamber reaches the size selected by the operator. When the bale reaches full size, the output of bale size sensor 106 causes the Full Bale flag to be set by the controller 100. On the next execution of the program, when step 330 (FIG. 3C) is reached, the test proves true. At step 331 the number of the last selected twine wrap pattern is retrieved and at step 332 it is tested to see if it is one of the factory installed programs PAt1–PAt3 or one of the programs PAt4–PAt6 generated by the operator through use of the twine learn program. If the test at step 332 indicates that the selected twine wrap pattern is PAt4, PAt5 or PAt6, the program branches to step 339 to execute the program for the selected twine wrap pattern.

Extend Twine Tubes.

After the wrap sequence is initiated as described above, the controller 100 first extends the twine tubes to the insert position illustrated at 116' in FIG. 1. If the test at step 332 shows that PAt1, PAt2 or PAt3 is the selected twine wrap pattern, the Wrap Enable flag is tested at step 333. This flag was previously cleared at step 340 so at step 341 the Extend flag is tested. This flag was also reset at step 340 so the program advances to step 345 where the Extend flag is set. The setting of this flag causes the extend relay 108 to be energized so that motor 112 begins to drive the twine tubes from the cut position toward the insert position.

At step 346 a 2-second lockout timer is started. The purpose of the timer is as follows. As the twine tubes move from the cut position toward the insert position they pass through the precut position and the precut position magnet causes the twine dispenser sensor 122 to produce an output signal. The lockout timer prevents the program from treating the sensor output signal as the one produced when the twine tubes are at the insert position where the insert position magnet also causes sensor 122 to produce an output signal.

At step 347 a 7-second Extend timer is started. This timer serves as a back-up as subsequently explained and prevents a lockup of the program if the insert position magnet on the twine dispensing mechanism should fail to actuate sensor 122 when the twine tubes are at the insert position.

After the Extend timer is set, the program jumps to step 390 (FIG. 3G) where the status of the tailgate sensor 104 is tested. The tailgate is closed so the program returns to step 300 to begin another cycle.

The second cycle proceeds in the same manner as the first cycle until step 341 is reached. Since the Extend flag was set during the preceding cycle, the test at step 341 proves true and at step 342 the 2-second lockout timer is tested to see if it has timed out. Assuming it has not, the program jumps to step 390 and then returns to step 300 as before.

The program steps executed in the second cycle are repeated until the 2-second timer times out. Meanwhile, the twine tubes are still being driven toward the insert position because the Extend flag is set. After two seconds the test at step 342 proves true. By this time the precut magnet has moved past the sensor 122. The program then begins sensing the status of sensor 122 to see if it is actuated by the insert position magnet. The status is tested at step 343. Assuming the twine tubes are not at the insert position, the Extend timer is tested at step 344 to see if seven seconds have elapsed since movement of the twine tubes began. If seven seconds have not elapsed the program jumps to step 390 and then returns to step 300 as described above.

When the twine tubes reach the insert position, the insert magnet on the dispensing mechanism should actuate sensor 122 and this condition is detected at step 343. If the insert magnet should fail to actuate sensor 122, then after seven seconds (a time sufficient to move the twine tubes from the cut to the insert position) the Extend timer times out and this condition is detected at step 344.

When the test at step 343 or 344 proves true, the program proceeds to step 350 (FIG. 3D) where the 2-second and 7-second timers are cleared. The Extend flag is also cleared thereby deenergizing the drive motor 112. Step 351 then sets the Wrap Enable and Retract Enable flags.

Starting Wrap Dwell.

After the twine tubes have been extended to the insert position as described above, the dangling ends of the twine are caught up in, and begin to wrap around, the rotating bale. Every factory installed program requires that two starting wraps be wrapped around the bale while it dwells at the insert position.

At step 352 the control timer is tested for a zero value. This timer was reset at step 340 so the test proves true. The last selected twine wrap pattern number is retrieved from memory at step 353 and then is tested at step 354 to see if it is PAt1. If it is the program moves to step 356. If it is not, the twine pattern number is tested at step 355 to see if it represents PAt2. If it does, then step 357 is executed. If the test at step 355 proves false, then the number must represent PAt3 and step 358 is executed.

Step 356, 357 or 358 retrieves from non-volatile memory the twine wrap pattern data installed therein at the factory. This data defines the wrap pattern and includes a number representing the number of retract steps in the program, a number representing the number of dwells to be executed during the program and the starting address of a retract table. There is a retract table for each of the factory installed programs. Each retract table includes a plurality of retract instructions, each instruction including a code identifying it as a retract instruction and a value representing the duration of time the twine tubes are to be retracted under control of the instruction. The last instruction in the retract table is a retract-to-cut instruction as subsequently described.

After step 356, 357 or 358 is executed, the Mode flag is tested at step 359. This flag, when set, causes a retract operation and when reset causes a dwell operation. The flag was cleared at step 340 so the test at step 359 proves false and step 360 is executed to test the Retract To Cut flag. This flag was also reset at step 340 so that the program moves to step 361 where the Retract flag is cleared. This flag was already reset so this execution of step 361 has no effect.

The length of time it takes to encircle the bale one time depends on the size of the bale. Steps 362–365 determine the time it takes to place one wrap around the bale. At step 362, the bale size, as measured by the bale size sensor 106, is read from memory and at step 363 it is used to derive a pointer into a Dwell Time Lookup Table. This table stores values representing, for various bale sizes, the dwell time necessary for encircling the bale one time with twine. Step 364 retrieves the base address of the table from memory. At step 365 the pointer computed from the bale size is added to the base address and the result used to access the table and retrieve the dwell time.

The Mode flag is set at step 366 and at step 367 the current dwell count is retrieved from memory. This count was reset to zero at step 340. Next the current dwell count is tested for zero at step 376 (FIG. 3E). Since the test proves true, step 377 is executed to compute the dwell time necessary for placing two starting wraps on the bale. After the computed dwell time is saved at step 378, step 379 increments the dwell count to 1 and saves it. The dwell time computed at step 377 is then loaded into the control timer by step 380 after which step 390 (FIG. 3G) is executed and the program returns to step 300.

On the next pass through the program the test at step 333 (FIG. 3C) proves true since the Wrap Enable flag was set at step 351. Step 334 then tests the Retract Enable flag at step 334 and since this flag was also set at step 351 the program branches to step 352 (FIG. 3D). Since the control timer now contains a value representing the dwell time, the test at step 352 proves false. The value in the control timer is decremented at step 398. The Retract flag is tested at step 399. This test proves false since the Retract flag was cleared at step 361. The program branches to step 390 and then returns to step 300 to begin another pass.

Succeeding passes are executed as described in the preceding paragraph with the dwell time in the control timer being tested at step 352 and decremented at step 398 on each pass. The count in the control timer reaches zero when two full starting wraps have been placed on the bale. On the next pass, the zero count is detected at step 352 and the program moves to step 353 to again retrieve the selected twine pattern program number from memory. The program is now ready to retract the twine tubes to the next dwell position.

Retract To Next Dwell.

Depending on the selected twine pattern program number as determined by steps 354 and 355, one of steps 356, 357 or 358 is executed to again retrieve from memory the factory installed data defining the selected twine pattern. When step 359 is executed it finds the Mode flag set since the flag was set at step 366. The program branches to step 368 (FIG. 3F) to retrieve the retract counter value from memory. Step 369 compares the value in the retract counter with the preset retract count value read from memory at step 356, 357 or 358. Assuming the values are not equal, the retract count is incremented and saved at step 371 and the Mode flag is cleared at step 372.

The controller is now ready to control a retract operation during which the twine tubes are moved from the insert position to a first intermediate dwell position. The value defining the time or duration of movement of the twine tubes is stored in a lookup table in non-volatile memory. To access the time value, the starting address of the lookup table is added to an address pointer at step 373. The address pointer at this time is zero since it was cleared at step 340. The result of the addition is used at step 374 to retrieve from the table an instruction containing a retract time value and a code. The code may define the instruction as a retract instruction or a retract-to-cut instruction. The table contains a plurality of retract instructions and the last instruction is a retract-to-cut instruction which is used as subsequently described.

The retract time and code read from the retract lookup table are saved at step 375 after which the lookup table address pointer is incremented and saved at step 349. At step 383 (FIG. 3G) the code read from the table is tested to see if it is the retract-to-cut code. Assuming that the code is the retract code, the test at step 383 proves false but the test at step 384 proves true so at step 385 the Retract flag is set. When the Retract flag is set, the controller energizes retract relay 110 so that the twine tubes are driven in the direction from the insert position toward the cut or home position.

The Retract time value is loaded into the control timer at step 386.

At step 387 the Precut Enable flag is tested and since it is not set, the program jumps to step 390 and then returns to step 300 as described above.

The Retract flag remains set and the twine tubes are driven until the retract time value entered into the control timer at step 386 has been reduced to zero. The program is repeatedly executed and the value in the control timer is reduced by one at step 398 each time the program is executed. Assuming no key actuation, during each execution of the program it follows a path which includes steps 300, 305 and 306 in FIG. 3A, steps 330–334 in FIG. 3C, steps 352, 398 and 399 in FIG. 3D and steps 387 (Precut Enable flag is not set) and 390 in FIG. 3G.

On the first execution of the program after the control timer count has been decremented to zero, the test of the control timer at step 352 proves true. The selected twine pattern is again retrieved from memory at step 353 and certain ones of steps 354–358 are executed as described above. The Mode flag was cleared at step 372 hence the test at step 359 proves false. Likewise the test at step 360 proves false since the Retract-To-Cut flag still has not been set. At step 361 the Retract flag is cleared and the controller deenergizes the retract relay 110 so that movement of the twine tubes stops. The twine tubes are now at a first intermediate dwell position where a single circular wrap is to be placed around the bale.

Placing An Intermediate Wrap.

Steps 362–367 are executed as described above to retrieve the dwell time from the dwell time lookup table, set the Mode flag and get the current dwell count.

The dwell count is tested for a zero value at step 376 (FIG. 3E). The test proves false since the dwell count was incremented by one at step 379 during the dwell time when the starting wraps were placed on the bale. The program thus branches to step 381 where the current dwell count is compared with the preset dwell count value PRE_DW_CNT retrieved from memory at step 356, 357 or 358. Assuming the values are not equal, the current dwell count is incremented and saved at step 379 and the dwell time necessary to put one wrap on the bale (derived from the lookup table at step 365) is loaded into the control timer at step 380. The program then jumps to step 390 and returns to step 300.

The program is repeatedly executed and the dwell time value in the control timer is first tested at step 352 and then decremented by one at step 398 on each pass. During each execution of the program during the dwell time, it proceeds through steps 300, 305 and 306 in FIG. 3A, steps 330–334 in FIG. 3C, steps 352, 398 and 399 in FIG. 3D and step 390 in FIG. 3G. When the count in the control timer reaches zero, the program branches from step 352 to step 353 to again retrieve the selected twine wrap pattern from memory in preparation for doing the next retract operation.

The controller alternately controls the twine tubes to retract and then dwell while one intermediate wrap is placed around the bale. The number of retracts and dwells is determined by the retract lookup table and the preset dwell count values in the twine pattern control word retrieved at step 356, 357 or 358. As previously explained, the retract count is incremented by one for each retract operation and is compared at step 369 with the preset retract count retrieved at step 356, 357 or 358. If the values are equal, a Precut Enable flag is set at step 370, thus providing an indication that the present retract operation has already moved the twine tubes away from the insert position to an intermediate position. Also, the insert position magnet has moved away from the sensor 122 and no longer causes the sensor to produce an output signal.

The purpose of the Precut Enable flag is as follows. As the twine tubes retract and dwell from the insert position toward the precut position, the initial several retract steps may not be able to move the insert position magnet far enough away from the sensor 122. The sensor 122 will produce an output signal as long as the insert magnet is in the vicinity of the sensor sensing range. If the Precut Enable flag is not set, this prevents the program from treating the sensor output signal as the one produced when the twine tubes at the precut position where the precut position magnet also causes sensor 122 to produce an output signal. When the Precut Enable flag is set at step 370, the program then begins sensing the status of sensor 122 to see if it is actuated by the precut position magnet. The status is tested at step 388.

After the Precut Enable flag is set, there are several more retract and dwell mode cycles (the number of cycles depends on the twine pattern selected) before the twine tubes reach the precut position.

Retract To Precut Position.

Assume that the controller has completed an intermediate dwell and is ready to begin a retract operation to the precut position. The twine pattern program information for the selected twine pattern is again read from memory at step 356, 357 or 358. The Mode flag is tested at step 359 and since it was set during the preceding dwell operation the program branches to FIG. 3F where the retract count is retrieved from memory at step 368 and compared at step 369 with the preset retract count retrieved at step 356, 357 or 358.

Since the two values are not equal, steps 371–375, 349 and 383–386 are executed as for prior retract operations to increment the retract count, clear the Mode flag, set the Retract flag and load the control timer with the retract time value. However, the test at step 387 now finds that the Precut Enable flag is set. The status of the twine dispenser sensor 122 is then tested at step 388 to see if the precut magnet on the twine dispensing mechanism is actuating the sensor. Assuming that the twine tubes are not yet at the precut position, the program branches to step 390 and then returns to step 300 as described above.

The program repeatedly cycles through steps 300, 305 and 306 (FIG. 3A), steps 330–334 (FIG. 3C), steps 352, 398 and 399 (FIG. 3D) and steps 387, 388 and 390 (FIG. 3G) with the control timer being tested for a zero value at step 352 on each cycle and decremented at step 398 if the count is not zero. The precut magnet on the twine dispensing mechanism should actuate the position sensor 122 shortly before the count in the control counter reaches zero. When the status of the position sensor is tested at step 388, the program clears the Retract flag at step 389 to deenergize the motor 112 since the twine tubes are at the precut position. The Retract Enable flag is also reset and the control timer is cleared.

After the Retract flag is cleared at step 389, the tailgate sensor is tested at step 390 and the program returns to step 300. Steps 300, 305 and 306 (FIG. 3A) and steps 330–334 (FIG. 3C) are executed as previously described. However, the test at step 334 proves false since the Retract Enable flag was reset at step 389. Step 335 gets the current dwell count and step 336 compares the current dwell count with the preset dwell count. If the current dwell count is equal to or greater than the preset dwell count then the program branches to step 352 (FIG. 3D) where the control timer is tested for a zero value and since it was cleared at step 389, the test at step 352 proves true. The controller is now ready to place end wraps on the bale.

Returning for the moment to step 336 of FIG. 3C, if the test shows that the current dwell count is less than the preset dwell count, the Retract and Mode flags are cleared at step 337. The control timer is cleared at step 338, the preset dwell count is loaded into the dwell counter, and the address pointer is set to get the retract to cut code from the retract lookup table. The reason for these steps is that the precut magnet 126 is position adjustable to vary the spacing of the end wraps from the ends of the bale. This may cause the precut position to be reached before the current dwell count equals the preset dwell count. Steps 337 and 338 restore synchronization. The program then tests the control timer at step 352 and since it contains a zero, the controller is ready to place end wraps on the bale.

End Wrap Dwell.

The end wrap dwell operation is similar to the intermediate dwell wrap operations except that the duration varies according to the number of end wraps to be placed on the bale. The number of end wraps required is stored at END_WRAPS which is initialized to a value of two at step 304 by the factory installed program and may be changed by the operator to any value in the range 2–5 as described above.

When the control timer is decremented to zero during the retract operation which brings the twine tubes to the precut position, the zero contents of the control timer are recognized at step 352. The control information for the selected twine pattern program is retrieved from memory at step 356, 357 or 358 and the Mode and Retract To Cut flags are tested at steps 359 and 360. Both flags are reset so steps 361–367 are executed as for prior dwell operations to clear the Retract flag, set the Mode flag, and compute the dwell time for one wrap. At step 376 (FIG. 3E) the dwell count is tested and since it is not zero, step 381 is executed to see if the current dwell count is equal to the preset dwell count obtained at step 356, 357 or 358. The two counts should now be equal so step 382 is executed to multiply the dwell time for one wrap, obtained at step 365, by the value stored in END_WRAPS. The dwell count is incremented and saved at step 379 and the dwell time is placed in the control timer at step 380.

A jump is then made to step 390 and a return made to step 300. The dwell then proceeds in the same as the wrap operations for intermediate dwells with the control timer being tested for zero at step 352 and decremented at step 398 on each pass of the program until the count in the control timer reaches zero. When the control timer reaches a count of zero, the application of the end wraps has been completed and the twine tubes should be retracted to the home or cut position.

Retract To Cut.

When the control timer reaches a count of zero, steps 356, 357 or 358 is executed as previously described to retrieve from memory the data for the selected twine pattern program. The Mode flag is in the set state when tested at step 359 and the program branches to FIG. 3F where the value in the retract counter is retrieved at step 368. The retract and preset retract counts are compared at step 369 and the program proceeds to step 371. Steps 371–375 and 349 are executed in the manner previously described to clear the Mode flag and retrieve the retract time and code. However, the retrieved code specifies a retract-to-cut operation rather than a normal retract operation and the time value specified is zero.

At step 383 (FIG. 3G) the retrieved code is tested and since it specifies a retract-to-cut operation the program branches to step 392 where the Retract and Retract-To-Cut flags are both set. The setting of the Retract flag causes the motor 112 to be energized to drive the twine tubes toward the home or cut position.

A 3-second timer is initiated at step 393. At step 394 the status of twine dispenser sensor 122 is sampled. If the sensor is not actuated and the test of the 3-second timer at step 400 indicates has not timed out, the program tests the status of the tailgate sensor 104 at step 390 before returning to step 300.

As the twine tubes move toward the home position, the program is repeatedly executed, the path of the program being steps 300, 305 and 306 in FIG. 3A, 330–336 in FIG. 3C, and step 352 in step 3D. Since the control timer was counted to zero during the end wrap dwell period and its contents have not changed, step 354 (and possibly step 355), one of steps 356–358 and steps 359 and 360 are executed. However, since the Retract-To-Cut flag has been set, the test of the flag at step 360 proves true so the program branches to step 397 (FIG. 3G) where the Wrap Complete/Eject Bale flag is tested. This flag was initially reset during initialization of controller 100 or cleared at step 391 when the tailgate was opened to eject the previous wrapped bale and its status has not changed. At step 394 the status of the twine dispenser sensor 122 is tested to see if the twine tubes are in the cut position i.e. the cut magnet on the twine dispenser mechanism has actuated the sensor. If not, the 3-second timer is tested at step 400 and if three seconds have not elapsed the status of the tailgate sensor is tested at step 390 before a return is made to step 300.

The program repeats the path described in the preceding paragraph until the cut position magnet actuates the twine dispenser mechanism sensor 122 or until the 3-second timer times out. The timer is merely a backup feature to prevent program lock-up in the event the cut position magnet should become dislodged or otherwise fail to actuate the sensor.

When sensor 122 is actuated or the 3-second timer times out, the program moves to step 395 where the Wrap Complete/Eject Bale flag is set. The Full Bale, Retract, Wrap Enable and Mode flags are cleared at step 396. Clearing of the Retract flag deenergizes the drive motor 112 and the twine tubes stop at the cut position where a conventional mechanism (not shown) cuts the ends of the twine. After testing the status of tailgate sensor 104 at step 390, the program returns to step 300.

At this point the bale has been completely wrapped and the twine supply severed from the portions of the twine that have been wrapped around the bale. The setting of the Wrap Complete/Eject Bale flag at step 395 has caused a visual display on the operator panel 102 to signal the operator that he may eject the wrapped bale from the baler. During the interval before the bale is ejected, the program repeatedly executes step 300, 305 and 306 in FIG. 3A (assuming no keys are depressed), steps 330 and 340 in FIG. 3C, and step 390 in FIG. 3G.

When the operator actuates a control to open the tailgate so that the bale is ejected, the opening of the tailgate is sensed at step 390. The program then clears the Full Bale and Wrap Complete/Eject Bale flags, the clearing of the latter flag causing the "eject" indication on the operator panel to be turned off. This completes the wrapping and ejection of the bale and the controller is ready to control the wrapping of the next bale once it has been formed.

From the foregoing description it is seen that the present invention provides a novel method and apparatus for varying the number of end wraps placed on a bale even though a factory installed program initially specifies a fixed number of end wraps. The number of end wraps may be changed by the operator merely by depressing keys on an operator panel and the number of end wraps may be changed without changing the number of starting and/or intermediate warps.

While a preferred embodiment of the invention has been described in specific detail, it will be understood that modifications and substitutions may be made in the described embodiment without departing from the spirit and scope of the invention as defined by the appended claims.

I claim:

1. In a round baler having filament dispensing means selectively movable opposite a rotating bale of crop material to wrap the bale with filament, the filament dispensing means being controllable by a controller having control means for executing a factory installed bale-wrapping program stored in a non-volatile memory to place on a bale a preset number of circular starting wraps, a preset number of circular intermediate wraps and a preset number of circular end wraps as specified in said bale-wrapping program, the improvement comprising:

an addressable storage location for storing a value representing said preset number of end wraps;

manually actuated switch means; and, modification means responsive to said switch means for modifying said value in said addressable storage location representing said preset number of end wraps specified in said program to obtain a further value representing an operator-specified number of circular end wraps, said preset number of starting wraps and said preset number of end wraps specified in said bale-wrapping program being unchangeable, said control means being responsive to a value in said addressable storage location and said program in said non-volatile memory for controlling said filament dispensing means to place on said bale exactly said preset number of circular starting wraps and no more, exactly said preset number of circular intermediate wraps and no more and the number of circular end wraps represented by said further value and no more each time said control means executes said program.

2. The improvement as claimed in claim 1 wherein said controller is responsive to a stored program generated by an operator for controlling said filament dispensing means to wrap a bale, said improvement further comprising:

manually actuated selector means for selecting either said factory installed program or said stored program generated by an operator as the program for controlling the filament dispensing means; and, means responsive to said selector means for enabling said modification means only when said factory installed program is selected.

3. The improvement as claimed in claim 1 wherein said baler includes a bale size sensor and generator means responsive to said bale size sensor for generating a time value representing the time it takes to place one wrap of said filament around said bale, said control means being responsive to said time value and a value in said addressable location for controlling said dispensing means to wrap said bale with a number of end wraps according to the value in said addressable storage location.

4. The improvement as claimed in claim 1 wherein said manually actuated switch means comprises first and second switches, said first switch enabling said modification means and said second switch causing modification of a value stored at said addressable storage location.

5. The improvement as claimed in claim 1 wherein said manually actuated switch means comprises first, second and third switches, said modification means including means responsive to said first and second switches for incrementing a value stored at said addressable storage location and means responsive to actuation of said first and third switches for decrementing a value stored at said addressable storage location.

6. The improvement as claimed in claim 5 and further comprising display means and means responsive to said first switch and said addressable storage location for displaying a value stored at said addressable storage location.

7. The improvement as claimed in claim 1 wherein said non-volatile memory has a plurality of factory-installed bale-wrapping programs therein, and said switch means includes a twine learn switch, said improvement further comprising a twine pattern switch and an enter/clear switch for selecting one of said factory-installed programs, said controller including means responsive to said twine learn switch when it is in a first position for inhibiting said control means and causing said filament dispensing means to place on a bale the number of starting, intermediate and end wraps specified by the selected bale-wrapping program.

8. The improvement in claim 7 and further comprising means for entering a fixed value into said addressable storage location when one of said factory-installed programs is selected.

9. The improvement as claimed in claim 8 wherein said modification means is responsive to said twine learn switch when it is in a second position to enable modification of said fixed value in said addressable storage location, said switch means including at least one switch for modifying said fixed value.

10. The improvement as claimed in claim 9 wherein said switch means includes two switches for modifying said fixed value.

11. The improvement as claimed in claim 9 wherein said at least one switch modifies said fixed value only if said one switch is actuated while said twine learn switch is in its second position.

12. The improvement as claimed in claim 10 wherein one of said switches for modifying said fixed value is an increment switch for incrementing said fixed value and the other of said switches is a decrement switch for decrementing said fixed value.

13. The improvement as claimed in claim 12 wherein said increment or said decrement switch must be actuated while said twine learn switch is in its second position in order to increment or decrement said fixed value.

14. In a round baler having filament dispensing means selectively movable opposite a rotating bale of crop material to wrap the bale with filament, the filament dispensing means being controllable by a control means operable in response to a factory installed bale-wrapping program stored in a non-volatile memory to place on a bale a preset number of circular starting wraps, a preset number of circular intermediate wraps and a preset number of circular end wraps, a method of selectively varying the number of end wraps placed on a bale, said method comprising:

providing an addressable storage location for storing a value representing said preset number of end wraps;

providing manually actuated switch means for changing a value in said addressable storage location;

selectively actuating the switch means to chance the value in said addressable storage location to a further value representing an operator-specified number of circular end wraps without in any way altering either said preset number of starting wraps or said preset number of intermediate wraps; and, wrapping the bale with exactly said preset number of circular starting wraps and no more, exactly said preset number of circular intermediate wrap and no more and exactly the number of circular end wraps represented by said further value and no more.

* * * * *